US010322343B2

(12) United States Patent
Norberg

(10) Patent No.: US 10,322,343 B2
(45) Date of Patent: Jun. 18, 2019

(54) G.P.U.-ASSISTED CHARACTER ANIMATION

(71) Applicant: Zynga Inc., San Francisco, CA (US)

(72) Inventor: Nils Jonas Norberg, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 142 days.

(21) Appl. No.: 15/652,991

(22) Filed: Jul. 18, 2017

(65) Prior Publication Data

US 2018/0117466 A1    May 3, 2018

Related U.S. Application Data

(60) Provisional application No. 62/415,261, filed on Oct. 31, 2016.

(51) Int. Cl.
*A63F 9/24* (2006.01)
*A63F 13/52* (2014.01)
(Continued)

(52) U.S. Cl.
CPC ............ *A63F 13/52* (2014.09); *A63F 13/327* (2014.09); *A63F 13/332* (2014.09);
(Continued)

(58) Field of Classification Search
CPC ......... G06T 11/00; G06T 13/00; G06T 13/80; G06T 2200/28; G06T 7/20; G06T 15/80; G06T 7/50; A63F 13/52
See application file for complete search history.

(56) References Cited

U.S. PATENT DOCUMENTS

2010/0271365 A1* 10/2010 Smith ..................... G06T 13/40
345/419
2015/0339852 A1* 11/2015 Plowman ................ G06T 15/80
345/423
(Continued)

*Primary Examiner* — Dmitry Suhol
*Assistant Examiner* — Carl V Larsen
(74) *Attorney, Agent, or Firm* — Schwegman Lundberg & Woessner, P.A.

(57) ABSTRACT

A system, a machine-readable storage medium storing instructions, and a computer-implemented method are described herein for an Animation Engine. The Animation Engine generates a color row representative of positional coordinates of movement of pixel data in an animation according to one or more colors of a color space. The Animation Engine divides the color row into a plurality of segments of equal length. For each segment of the color row, the Animation Engine scales down the respective segment according to a first scaling factor to generate a down-scaled segment. The Animation Engine expands the down-scaled segment according to an original length of the respective segment. The Animation Engine compares at least one color distortion present in the expanded down-scaled segment to at least one color present in the respective segment with respect to a distortion threshold. Upon determining the distortion threshold is not exceeded, the Animation Engine generates a portion of a color time row, according to a gray scale color range, that corresponds to the respective down-scaled segment, wherein at least one dark color in the color time row represents an early time offset and at least one bright color represent a later time offset. The Animation Engine compresses the down-scaled segment with at least one color row reading position referenced by at least one early time offset in the color time row.

20 Claims, 10 Drawing Sheets
(3 of 10 Drawing Sheet(s) Filed in Color)

(51) Int. Cl.
  *A63F 13/795* (2014.01)
  *A63F 13/335* (2014.01)
  *A63F 13/537* (2014.01)
  *A63F 13/327* (2014.01)
  *A63F 13/332* (2014.01)
  *A63F 13/92* (2014.01)
  *A63F 13/493* (2014.01)
  *A63F 13/58* (2014.01)
  *G06T 13/80* (2011.01)
  *G06T 13/00* (2011.01)
  *G06T 11/00* (2006.01)

(52) U.S. Cl.
  CPC .......... *A63F 13/335* (2014.09); *A63F 13/493* (2014.09); *A63F 13/537* (2014.09); *A63F 13/58* (2014.09); *A63F 13/795* (2014.09); *A63F 13/92* (2014.09); *G06T 11/00* (2013.01); *G06T 13/00* (2013.01); *G06T 13/80* (2013.01)

(56) References Cited

U.S. PATENT DOCUMENTS

2016/0267664 A1* 9/2016 Davis ................ G06T 13/80
2016/0292812 A1* 10/2016 Wu .................... G06T 1/20

* cited by examiner

G.P.U.-ASSISTED CHARACTER ANIMATION

CROSS-REFERENCE TO RELATED APPLICATION

This application claims the benefit of priority to U.S. Provisional Patent Application entitled "G.P.U.-Assisted Character Animation," Ser. No. 62/415,261, filed Oct. 31, 2016, which is hereby incorporated herein by reference in its entirety.

TECHNICAL FIELD

The subject matter disclosed herein generally relates to the technical field of special-purpose machines that facilitate animation, including software-configured computerized variants of such special-purpose machines and improvements to such variants, and to the technologies by which such special-purpose machines become improved compared to other special-purpose machines that facilitate animation.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In some embodiments, a game interface for the computer-implemented game can instead or additionally comprise an augmented reality display or a virtual reality display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
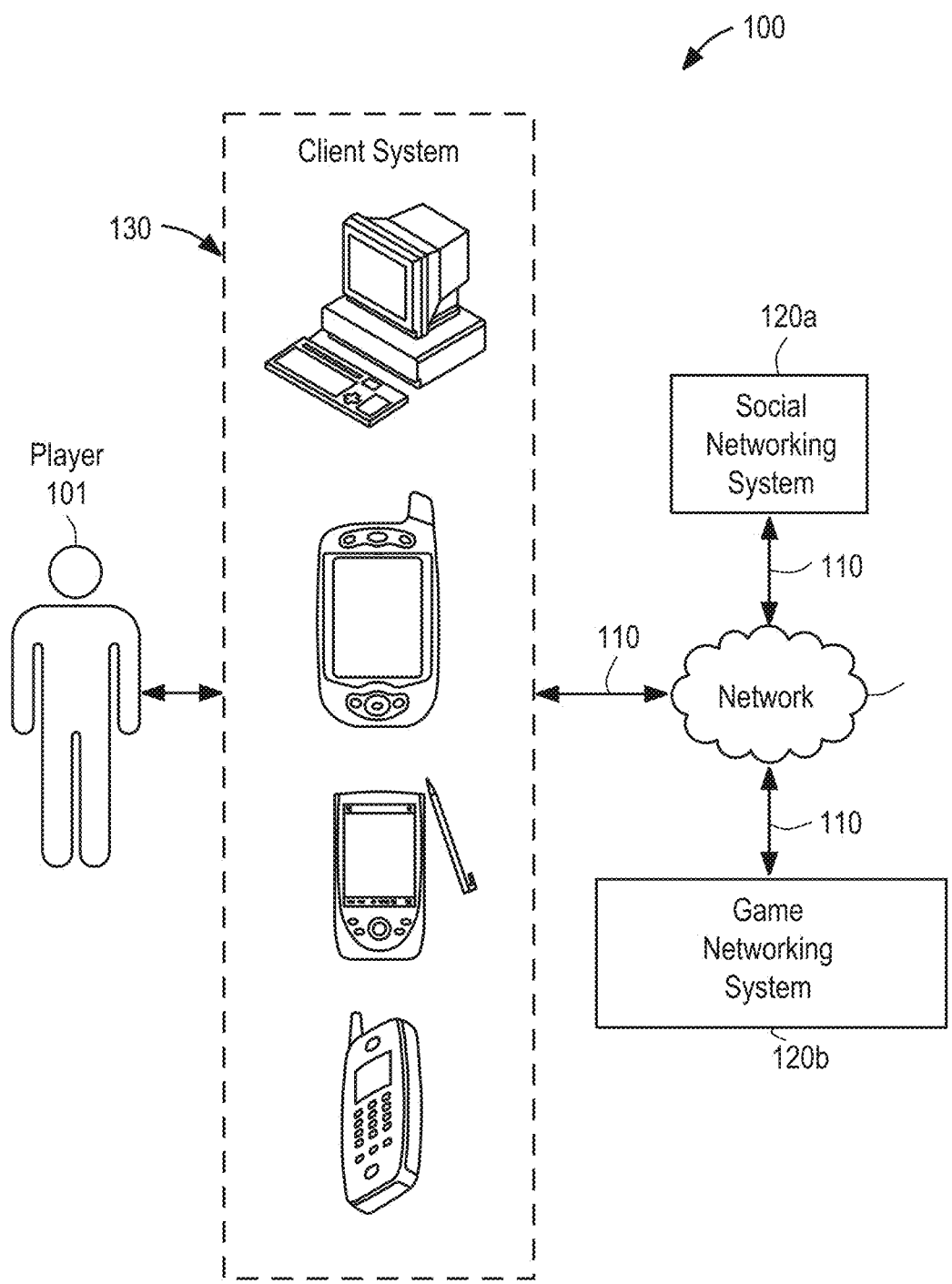
FIG. 1 is a schematic diagram showing an example of a system, according to some example embodiments.

One aspect of the disclosure provides for a system, a machine-readable storage medium storing instructions, and a computer-implemented method for a game engine, such as an Animation Engine.

The Animation Engine generates a color row representative of positional coordinates of movement of pixel data in an animation according to one or more colors of a color space. The Animation Engine scales down the color row according to a first scaling factor to generate a down-scaled color row. The Animation Engine expands the down-scaled color row according to an original length of the color row. The Animation Engine compares at least one color distortion present in the expanded down-scaled color to at least one color present in the color row with respect to a distortion threshold. Upon determining the distortion threshold is not exceeded, the Animation Engine divides the down-scaled color row into a plurality of segments of equal length. The Animation Engine generates a color time row according to a gray scale color range, wherein at least one dark color represents an early time offset and at least one bright color represent a later time offset. The Animation Engine compresses a first segment of the down-scaled color row with at least one color row reading position referenced by at least one early time offset in the color time row.

In various embodiments, it is understood that such compression with respect to the color time row can be performed on the original color row itself, wherein the original color row is divided into a plurality of segments of equal length. The scaling factor is then applied to each respective segment to determine a compressed length of the down-scaled segment when the colors in the scaled down segment do not exceed a distortion threshold as compared to the segment at its original length. The Animation Engine generates a color time row to further compress each down-scaled segment with at least one color row reading position referenced by at least one early time offset in the color time row. In various embodiments, the pixel data can be pixel data related to a virtual object in an online game. In various embodiments, the pixel data can be pixel data related to a feature or character of a virtual environment of an online game. In various embodiments, the pixel data can be pixel data related to a display position in an online game.

Various example embodiments may be provided with respect to pixel data for a virtual reality (VR) display or an augmented reality (AR) display. AR comprises a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. An augmented reality gaming device may allow players to interact with visual elements thus overlaid on the view of reality. Augmentation may be performed in real-time and may comprise overlaying on the view of reality one or more user interface elements that can be selected a manipulated by the user, and may further comprise overlaying on the view of reality game objects and/or character with which the player can interact during gameplay.

Virtual Reality (VR), which can be referred to as immersive multimedia or computer-simulated life, replicates an environment that simulates physical presence in places in the real world or imagined worlds and lets the user interact in that world. Virtual reality artificially creates sensory experiences, which can include sight, hearing, touch, smell, taste, and more. Virtual reality environments can be displayed either on a computer screen or with special stereoscopic displays, and some simulations include additional sensory information and focus on real sound through speakers or headphones targeted towards VR users. Some advanced, haptic, systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The simulated gaming environment displayed to the user by use of a virtual reality gaming device can for some games be similar to the real world in order to create a lifelike experience, while the virtual gaming environment seemingly inhabited by the player during VR gameplay may in other embodiments be stylized environments that differ significantly from reality.

It is understood that various embodiments described herein further include encoded instructions that comprise operations to generate a user interface(s) and various user interface elements related to the online game, a virtual online gaming environment and other virtual environments. The user interface and the various user interface elements can be representative of—or based on—any of the operations, colors, pixels, color space, rows, segments, and offset as described herein. In addition, the user interface and various user interface elements are caused for display by the Animation Engine on a computing device, a server computing device, a mobile computing device, etc.

Social Network Systems and Game Networking Systems

FIG. 1 illustrates an example of a system for implementing various disclosed embodiments. In particular embodiments, system 100 comprises player 101, social networking system 120a, game networking system 120b (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a (i.e. social network system) is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120*a*, game networking system 120*b*, client system 130, and network 160, this disclosure contemplates any suitable connections between player 101, social networking system 120*a*, game networking system 120*b*, client system 130, and network 160. As an example and not by way of limitation, in particular embodiments, client system 130 may have a direct connection to social networking system 120*a* or game networking system 120*b*, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b* (i.e. online gaming system), which includes a Notification Generator 150 that performs operations according to embodiments as described herein. The game networking system 120*b* can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Storing Game-Related Data

A database may store any data relating to game play within a game networking system 120*b*. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 120*b* may determine the player's friend preferences based on player attributes that the player's first-degree friends have in common, and may store these player attributes as friend preferences in the player profile. Furthermore, the game networking system 120*b* may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 120b may determine the player's likelihood to lead value based on information from other players that interact with this player. For example, the game networking system 120b may determine the player's likelihood to lead value by measuring the other players' satisfaction in the virtual game, measuring their satisfaction from their interaction with the player, measuring the gameplay frequency for the other players in relation to their interaction frequency with the player (e.g., the ability for the player to retain others), and/or the like.

The game networking system 120b may also determine the player's likelihood to lead value based on information about the player's interactions with others and the outcome of these interactions. For example, the game networking system 120b may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120b may determine the player's likelihood to lead value based on determining a likelihood for the other players to perform a certain action in response to interacting or communicating with the player and/or the player's virtual environment.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
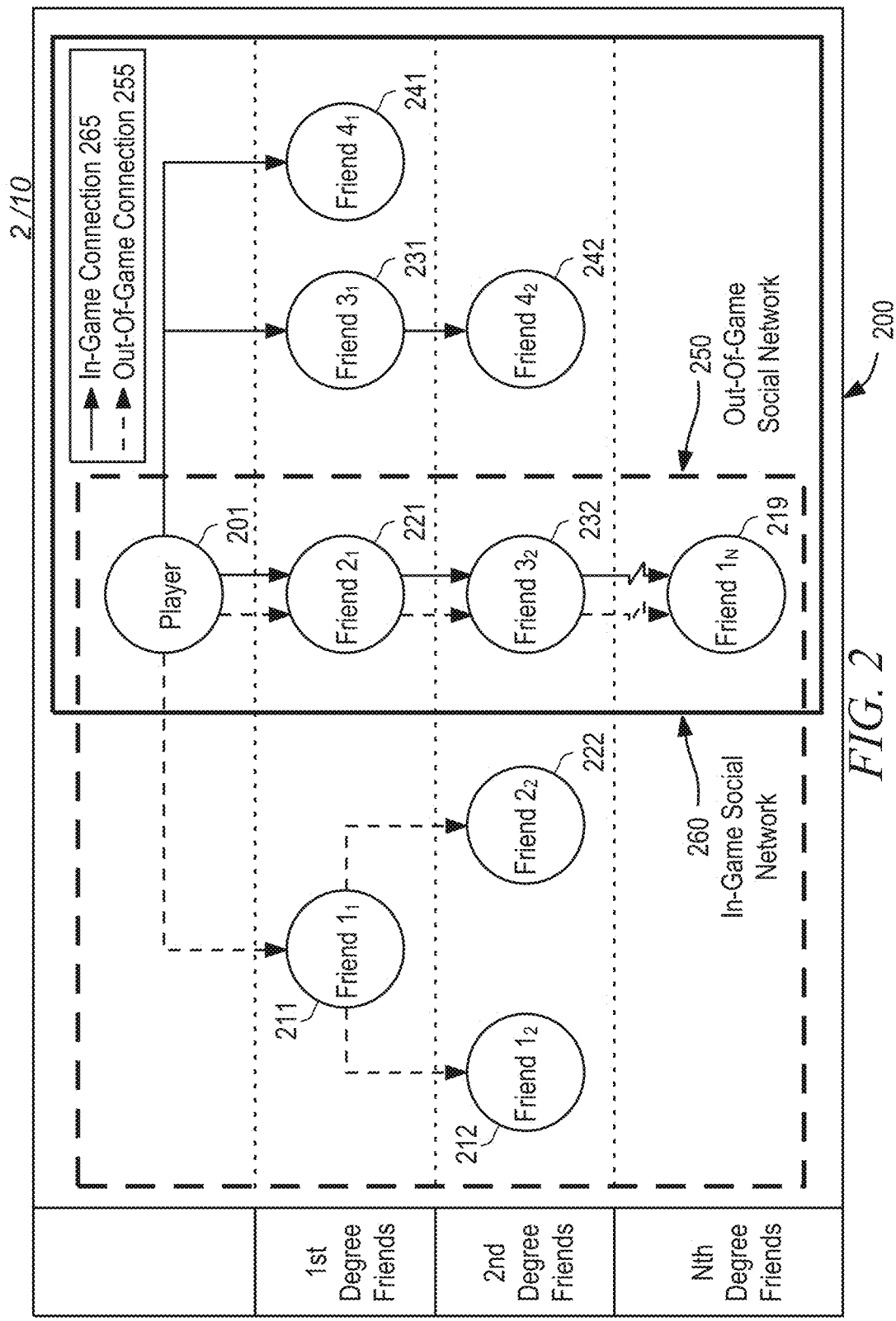
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user" and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Although the above example embodiments described as being implemented via a web browser on a client device, it is to be noted that a game display may in some embodiments be provided by a virtual reality (VR) display or an augmented reality (AR) display. AR comprises a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. An augmented reality gaming device may allow players to interact with visual elements thus overlaid on the view of reality. Augmentation may be performed in real-time and may comprise overlaying on the view of reality one or more user interface elements that can be selected a manipulated by the user, and may further comprise overlaying on the view of reality game objects and/or character with which the player can interact during gameplay.

Graphics Processor Unit (G.P.U.)-Assisted Character Animation

In conventional systems, animations are represented by pixel data based on positional coordinates that change along an x, y, and z axis. Such a change in the positional coordinates of the pixel data, when rendered, creates the movement of the animation—as opposed to a static image.

Figure 3:
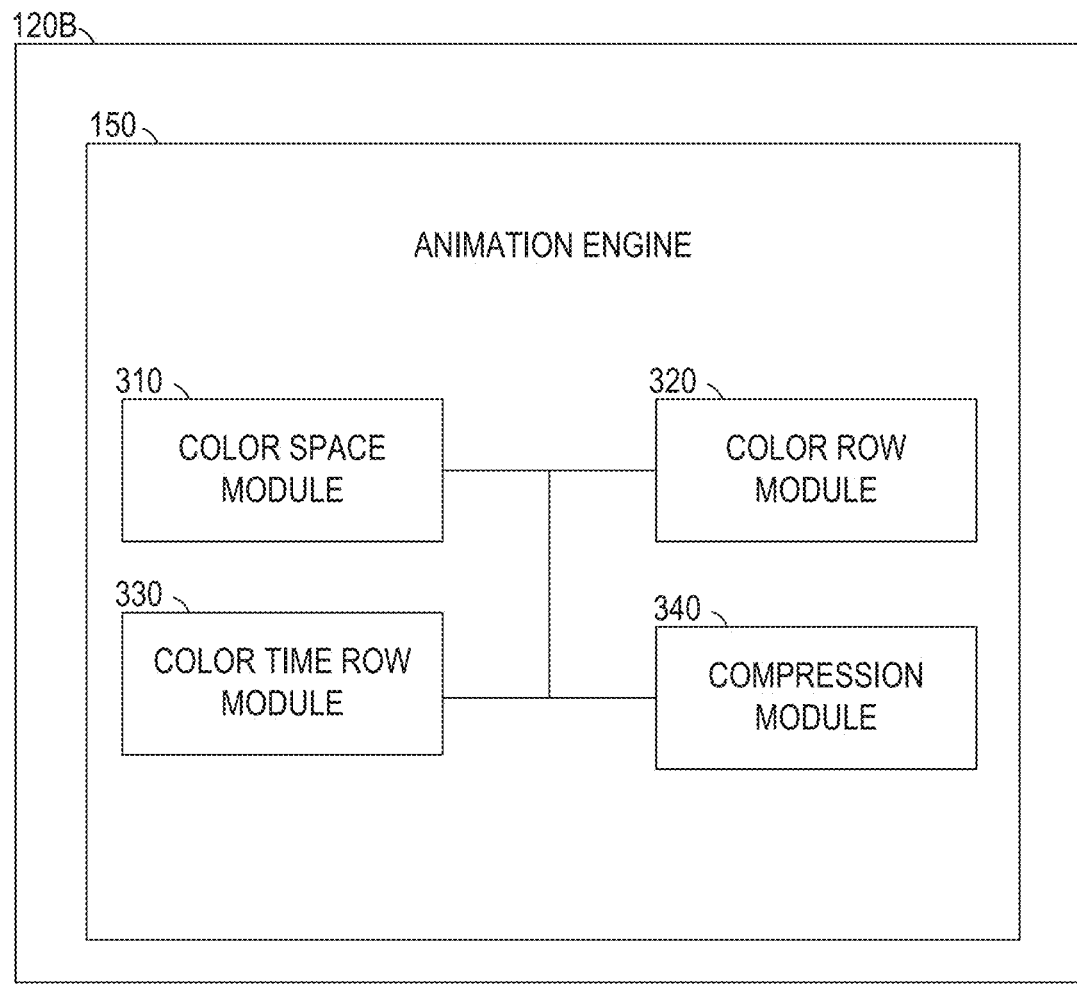
FIG. 3 is a block diagram illustrating components of a computing device, according to some example embodiments.

FIG. 3 is a block diagram illustrating components of a game networking system, according to some example embodiments. The game networking system 120b includes an Animation Engine 150. The Animation Engine 150 includes a color space module 310, a color row module 320, a color time row module 330 and a compression module 340.

In various example embodiments, the color space module 310 is a hardware-implemented module that controls, manages and stores information related to representing movement of pixel data according to a color space, as described herein.

In various example embodiments, the color row module 320 is a hardware-implemented module that controls, manages and stores information related to generating a color row for pixel data, as described herein.

In various example embodiments, the color time row module 330 is a hardware-implemented module that controls, manages and stores information related to generating a color time row that corresponds to one or more time offsets for reading a color row or a color row segment(s), as described herein.

In various example embodiments, the compression module 340 is a hardware-implemented module that controls, manages and stores information related to applying one or more scaling factors to a color row and a segment of a color row, as described herein. The compression module 340 further compresses color row segments based on one or more time offsets that correspond to color row reading positions.

The modules 310-340 are configured to communicate with each other (e.g., via a bus, shared memory, or a switch). Any one or more of the modules 310-340 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
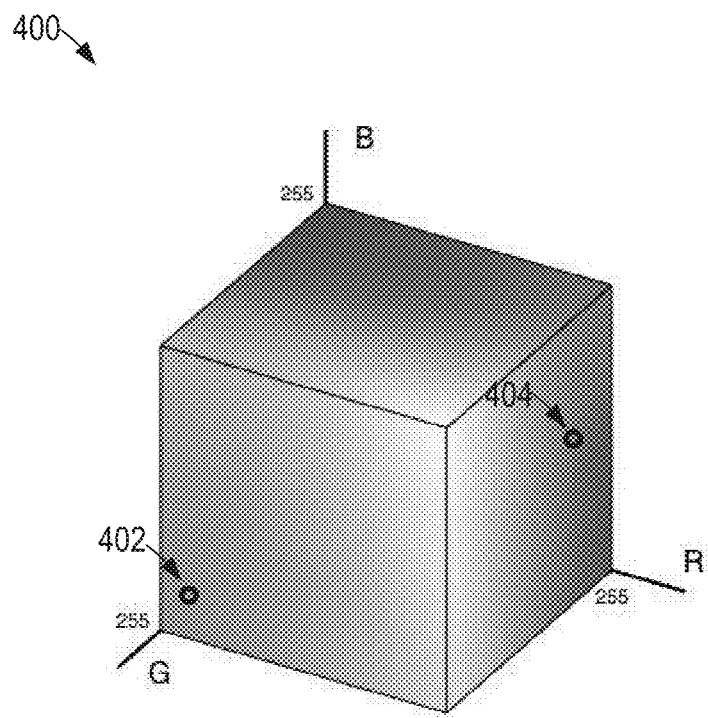
FIG. 4 is a block diagram illustrating a color space according to some example embodiments.

FIG. 4 is a block diagram illustrating a color space according to some example embodiments.

The Animation Engine 150 represents pixel data of an animation according to a color space based on red, blue, green colors— as opposed to an x, y, and z axis. As such, different colors represent respective different positions in the color space 400 itself. To that end, a change of color in the color space 400 with respect to pixel data represents movement in the animation. For example, pixel data for a pixel includes a first positional coordinate 402 that maps to a first color in the color space 400 and a second positional coordinate 404 maps to a second color in the color space 400. The first positional coordinate 402 occurs at a point of time in the animation prior to the second positional coordinate 404 and there is a high contrast between the first and second colors. Such a high contrast indicates the pixel is involved is displaying significant movement (or motion) in the animation during the first and second points of time. However, if the pixel data was to correspond to a relatively fixed portion of the animation (i.e. no movement), then the pixel data is represented by a fixed color (i.e. fixed positional coordinates) over time. Again, the colors that map to positional coordinates in the color space 400 are not representative of the colors to be rendered for the animation. Rather, such positional coordinate represent a degree(s) of movement of an animation that is displayed by a respective pixel—whereby changes in the colors that are mapped from positional coordinates in the color space 400 represent the animation's movements.

Figure 5:
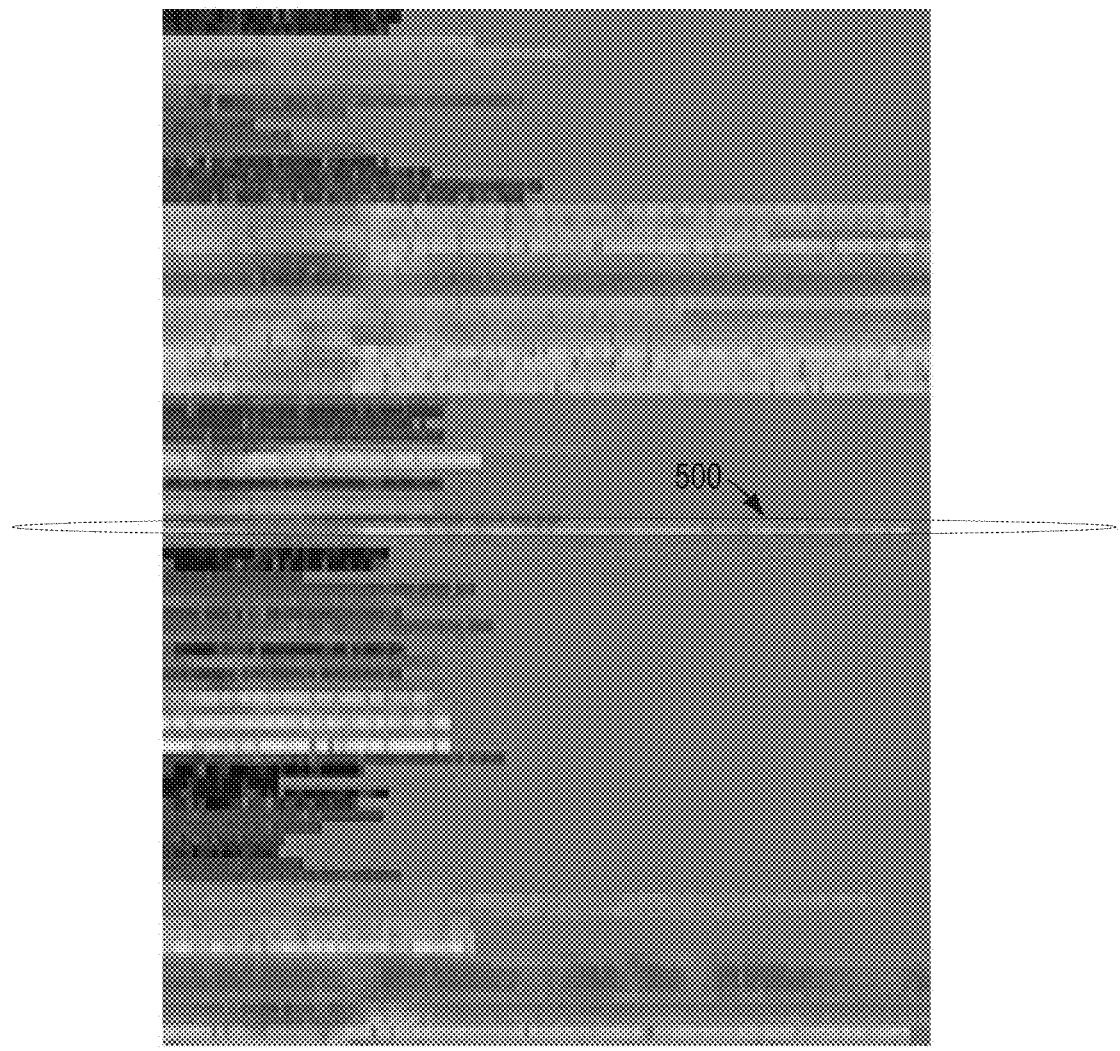
FIG. 5 is a block diagram illustrating at least one color row according to some example embodiments.

FIG. 5 is a block diagram illustrating at least one color row according to some example embodiments.

Each pixel data is represented according to a color row, where the colors present in the color row represent the various positions of the pixel data in the color space 400 and not the color(s) in which the animation will be rendered. Therefore, a first color row with many changes in color represent pixel data of a first portion of the animation that includes the visual appearance of movement and a second color row with few changes in color represents pixel data of a second portion of the animation that is relatively fixed.

The Animation Engine 150 executes various stages of compression on each color row (or a color row segment) to identify a compressed color row length for each color row. That is, each color row may have a different compressed color row length. To compress a given color row 500 (or a color row segment), the Animation Engine 150 selects of first scaling factor to minimize the original length of the given color row 500 to generate a down-scaled color row. The colors in the down-scaled color row may have a certain amount of distortions (such as blurriness) as result of the scaling factor, much in same the way that images become blurry as they are scaled down (or minimized).

The Animation Engine 150 returns the down-scaled color row to the original length of the given color row—but does not rescale the color content of the down-scaled color row—to generate an original length down-scaled color row. In this respect, the Animation Engine 150 "stretches" or "expands" the down-scaled color row back to the original length of the given color row 500. Therefore, while the original length down-scaled color row (or "expanded" down-scaled color row) and the given color row have the same length, their respective colors may have some differences since the original length down-scaled color row will retain the distortions caused by the first scaling factor.

The Animation Engine 150 compares the given color row 500 to the original length down-scaled color row against a maximum error threshold. The maximum error threshold represents an amount of distortion (such as color distortion) that is acceptable. If the maximum error threshold is exceeded, the Animation Engine 150 selects a second scaling factor larger than the first scaling factor and repeats the process of scaling down, stretching back to original length and comparing to the maximum error threshold. Upon determining the maximum error threshold is not exceeded, the Animation Engine 150 assigns the length of the most recent down-scaled color row (hereinafter "scaled color row") as a first compressed length.

It is understood that distortion will be negligible for those color rows (or color row segments) that have a low variation of color. For example, if a color row (or color row segment) is mostly blue or black, it is unlikely that much color distortion will occur after applying the first scaling factor and stretching back to original length. However, if a different color row (or color segment) has many contrasting colors—representing pixel data for significant movement in the animation—then there is a high likelihood that color distortion will occur after applying the first scaling factor and stretching back to original length. Such color distortion will most likely exceed the maximum error threshold thereby necessitating use of a larger, subsequent scaling factor. As such, those color rows (or color row segments) that have low color variability will tend to have compressed lengths that are shorter than the color rows (or color row segments) that have more color variability.

Figure 6:
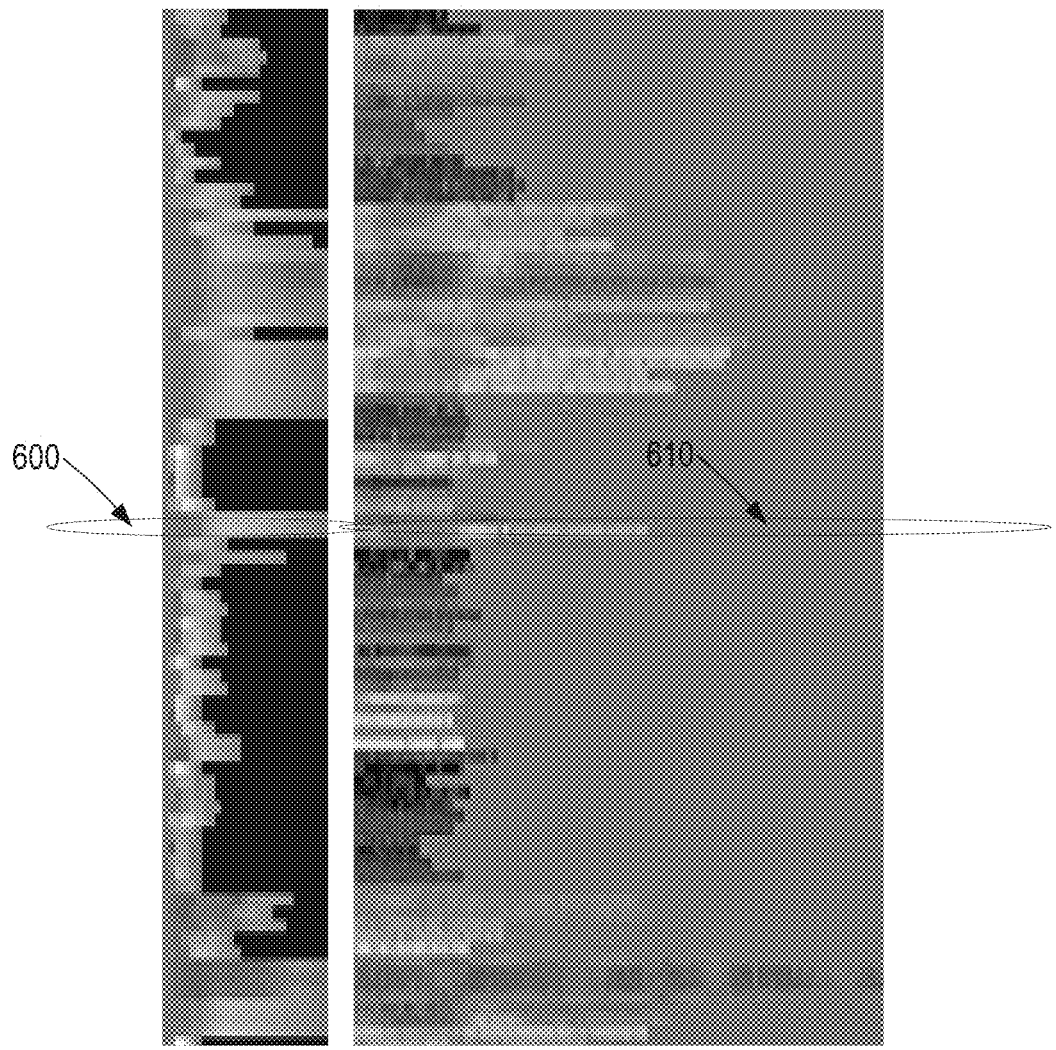
FIG. 6 is a block diagram illustrating a color time row associated with a color row according to some example embodiments.

FIG. 6 is a block diagram illustrating a color time row associated with a color row according to some example embodiments.

The Animation Engine 150 divides the scaled color row into multiple segments of equal length. For example, the scaled color row can be divided into three segments of equal length. Each segment has its own amount of color changes. That is, a first segment has many stark changes in color, a second segment has a few stark changes in color and a third segment has very few changes in color. Such differences in color changes between the three segments indicates that the first segment represents when the pixel data position is changing the most due to movement in the animation and the third segment represents when the pixel data position is changing the least due to less movement in the animation. As such, the first segment represents that the pixel data corresponds to movement that will be rendered in the animation, whereas the third segment represents when the pixel data becomes a relatively fixed portion of the animation later in time.

The Animation Engine 150 generates a color time row 600 for the three segments of the scaled color row. The color time row is represented in gray scale colors. The colors (black-to-gray-to-white-are various shades of such colors) of the color time row represent time offsets for reading the three segments of the scaled color row. The darker colors in the color time row 600 represent respective time offsets that are earlier in time and the respectively brighter colors in the color time row 600 represent time offsets that are later in time. For example, the portion of the color time row 600 that maps to the third segment (i.e. when the pixel data position is changing the least) will be progressively brighter to indicate one or more time offsets later in time.

The time offsets that are later in time allows the Animation Engine 150 to further compress the third segment since the color of the third segment is relatively steady. That is, as a graphics processor unit (G.P.U.) reads through the compressed third segment, the time offset will decrement the current reading position "later in time." In other words, the first reading position will be read and the second reading position will have a "bright" time offset back to the first reading position and the third reading position will have a "brighter" time offset back to the first reading position and the fourth reading position will have an "even brighter" time offset back to the first reading position. Therefore, the third segment can be significantly compressed since the time offsets will direct the G.P.U. to look back to read the same color at the first reading position. The Animation Engine 150 includes the compressed third segment as part of a final compressed color row 610.

Figure 7:
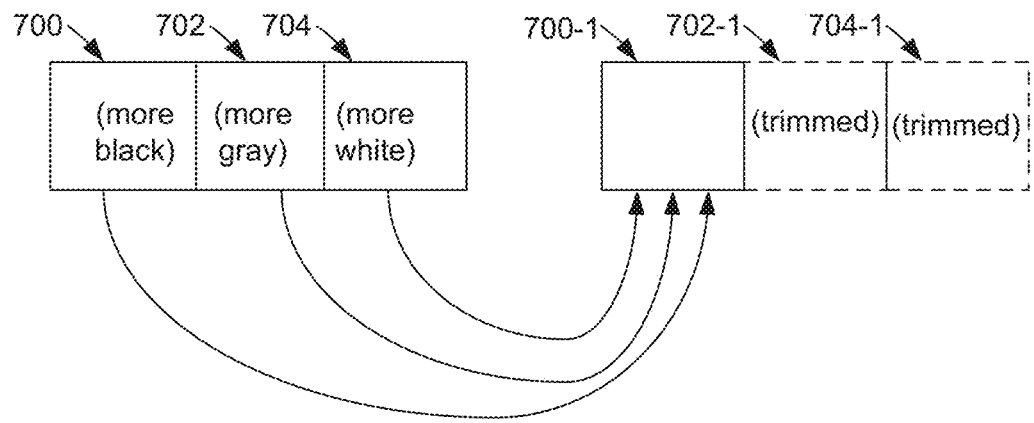
FIG. 7 is a block diagram illustrating a color time row associated with a color row according to some example embodiments.

FIG. 7 is a block diagram illustrating a color time row associated with a color row according to some example embodiments.

The Animation Engine 150 generates color time rows to further compress color row segments that have less color variability. The Animation Engine 150 generates color time row segments 700, 702, 704 that are associated with reading positions of respective down-scaled segments 700-1, 702-1, 704-1 of a color row. The colors of the respective down-scaled segments 700-1, 702-1, 704-1 are all the same, thereby representing pixel data that has fixed positional coordinates in the color space 400 over a period of time. Such pixel data is not involved in representing movement in the animation during that period of time.

The Animation Engine 150 fills the color time row segments 700, 702, 704 with gray scale color content based on various shades of black, gray and white. The gray scale color in each of the color time row segments 700, 702, 704 indicates an offset from a reading position of a corresponding down-scaled segment. The lighter (or brighter) the gray scale color content, then that represents how much further back the Animation Engine 150 will go to access a down-scaled segment at an earlier reading position. For example, a first color time row segment 700 has more black—or is much more darker—than other color time row segments 702, 704. A darker color time row segment represents no offset (or less of an offset) from the reading position of the down-scaled segment to which it corresponds. As such, the darker color of the first color time row segment 700 will trigger the Animation Engine 150 to read the color of the down-scaled segment 700-1 at its reading position. A second color time row segment 702 has more gray color content—or is lighter than the first color time row segment 700. Such an increase in brightness represents an offset from the reading position of the second down-scaled segment 702-1. As such, color content of the second color time row segment 702 triggers the Animation Engine 150 to offset the reading position of the second down-scaled segment 702-1 back to the reading position of the first down-scaled segment 700-1. The color that will be read will be the color at the first down-scaled segment 700-1, which is the same color as the second down-scaled segment 702-1. In other words, the color at the first down-scaled segment 700-1 is read a second time. The second down-scaled segment 702-1 is no longer needed because the same color is re-read at the reading position of the first down-scaled segment 700-1. The Animation Engine 150 thereby trims (or deletes) the second down-scaled segment 702-1.

A third color time row segment 704 has more white color content—or is lighter than the first and second color time row segments 700, 702. Such an increase in brightness represents a larger offset from the reading position of the third down-scaled segment 704-1. As such, color content of the third color time row segment 704 triggers the Animation Engine 150 to offset the reading position of the third down-scaled segment 704-1 back to the reading position of the first down-scaled segment 700-1. The color that will be read will be the color at the first down-scaled segment 700-1, which is the same color as the third down-scaled segment 704-1. In other words, the color at the first down-scaled segment 700-1 is read a third time. The third down-scaled segment 704-1 is no longer needed because the same color is re-read at the reading position of the first down-scaled segment 700-1. The Animation Engine 150 thereby trims (or deletes) the third down-scaled segment 704-1 as well.

Therefore, all that is needed to represent the first, second and third down-scaled segments 700-1, 702-1, 704-1 are the color time row segments 700, 702, 704 and just the first down-scaled segment 700-1. During read operations, as the color time row segments 700, 702, 704 become brighter (more gray and/or white), the Animation Engine 150 will offset back to the reading position of first down-scaled segment 700-1 to read the color at the first down-scaled segment 700-1. This way, the Animation Engine 150 is simulating the reading of colors of down-scaled segments that occurred "later in time"—but have already been trimmed.

Data Flow

Figure 8:
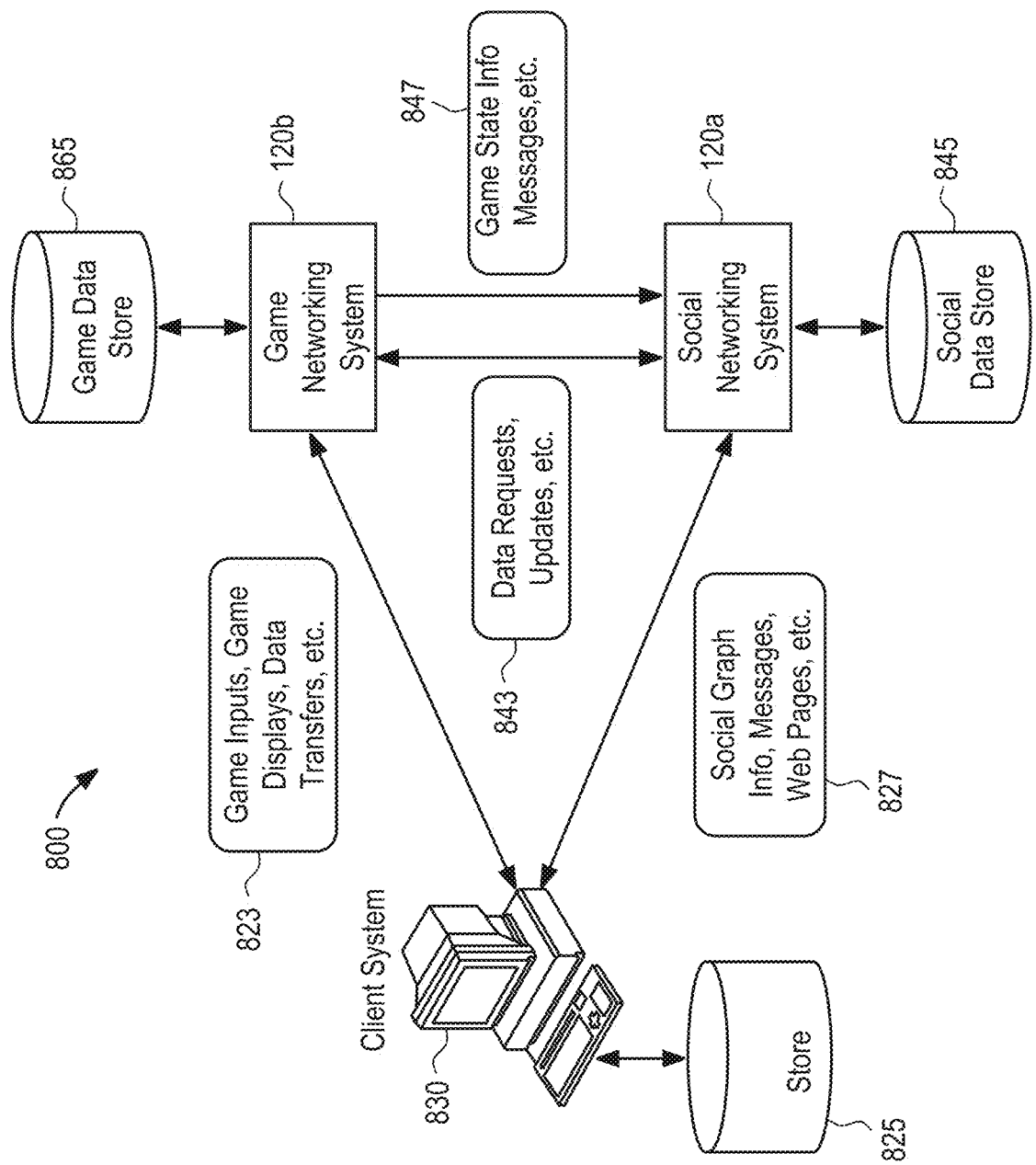
FIG. 8 is a diagrammatic representation of an example data flow between example components of the example system of FIG. 1, according to some example embodiments.

FIG. 8 illustrates an example data flow between the components of system 800. In particular embodiments, system 800 can include client system 730, social networking system 120a (i.e. social network system), and game networking system 120b (i.e. online game system system). The components of system 800 can be connected to each other in any suitable configuration, using any suitable type of connection. The components may be connected directly or over any suitable network. Client system 830, social networking system 120a, and game networking system 120bb can each have one or more corresponding data stores such as local data store 835, social data store 845, and game data store 865, respectively. Social networking system 120a and game networking system 120b can also have one or more servers that can communicate with client system 830 over an appropriate network. Social networking system 120a and game networking system 120b can have, for example, one or more internet servers for communicating with client system 830 via the Internet. Similarly, social networking system 120a and game networking system 120b can have one or more mobile servers for communicating with client system 830 via a mobile network (e.g., GSM, PCS, Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 120b. This data can include, for example, webpages, messages, game inputs, game displays, HTTP packets, data requests, transaction information, updates, and other suitable data. At some other time, or at the same time, game networking system 120b can communicate data 843, 847 (e.g., game state information, game system account information, page info, messages, data requests, updates, etc.) with other networking systems, such as social networking system 120a (e.g., Facebook, Myspace, etc.). Client system 830 can also receive and transmit data 827 to and from social networking system 120a. This data can include, for example, webpages, messages, social graph information, social network displays, HTTP packets, data requests, transaction information, updates, and other suitable data.

Communication between client system 830, social networking system 120a, and game networking system 120b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120b, the BLOB containing the game state for the instance corresponding to the player can be transmitted to client system 830 for use by a client-side executed object to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 120b. Game networking system 120b may itself operate by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b may then re-serialize the game state, now modified, into a BLOB and pass this to a memory cache layer for lazy updates to a persistent database.

With a client-server environment in which the online games may run, one server system, such as game networking system 120b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 120b for further processing. In addition, multiple client systems 830 may transmit other types of application data to game networking system 120b.

In particular embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 120a or game networking system 120b), where an instance of the online game is executed remotely on a client system 830, which then transmits application event data to the hosting system such that the remote game server synchronizes game state associated with the instance executed by the client system 830.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 120a or game networking system 120b). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 120b. However, to expedite the processing and hence the speed of the overall gaming experience, the Flash client may collect a batch of some number of events or updates into a batch file. The number of events or updates may be determined by the Flash client dynamically or determined by game networking system 120b based on server loads or other factors. For example, client system 830 may send a batch file to game networking system 120b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 530, game networking system 120b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120b may retrieve the corresponding BLOB from the database to determine the most-recent values of the game-related data. In particular embodiments, while a player is playing the online game, game networking system 120b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
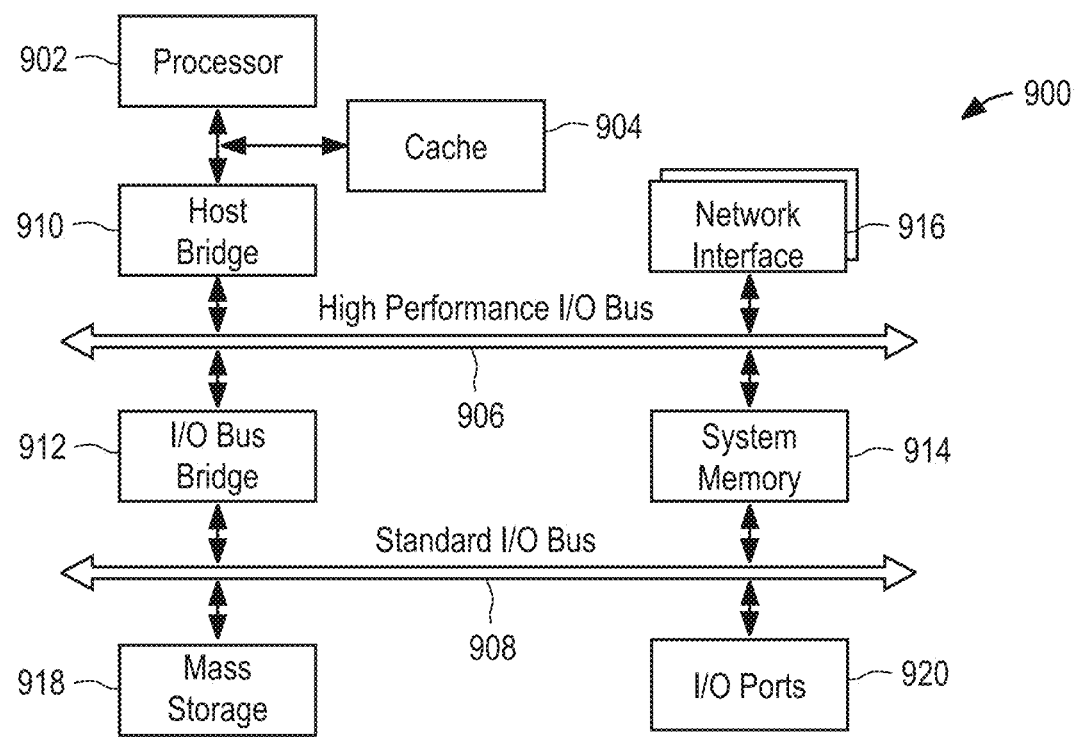
FIG. 9 illustrates an example computing system architecture, which may be used to implement a server or a client system illustrated in FIG. 10, according to some example embodiments.
Figure 10:
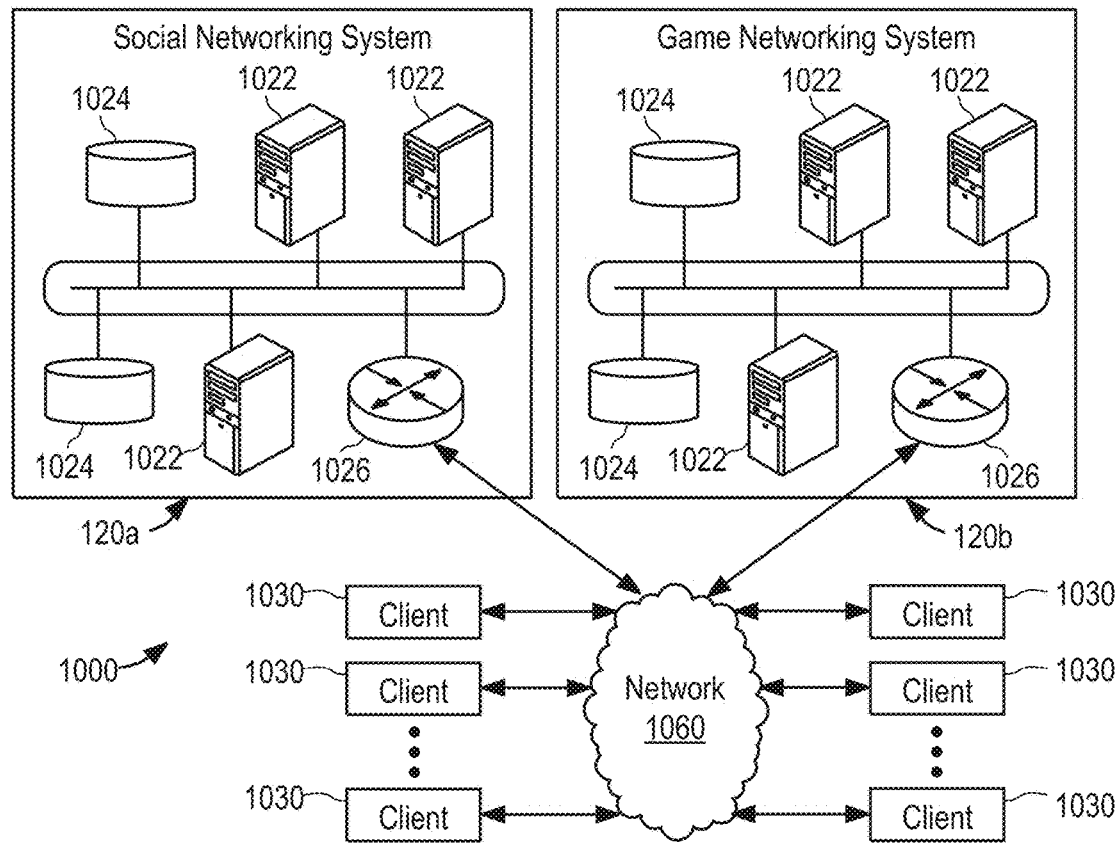
FIG. 10 illustrates an example network environment, in which various example embodiments may operate.

FIG. 9 illustrates an example computing system architecture, which may be used to implement a server 1022 or a client system 1030 illustrated in FIG. 10. In one embodiment, hardware system 900 comprises a processor 902, a cache memory 904, and one or more executable modules and drivers, stored on a tangible computer readable medium, directed to the functions described herein. Additionally, hardware system 900 may include a high performance input/output (I/O) bus 906 and a standard I/O bus 908. A host bridge 910 may couple processor 902 to high performance I/O bus 906, whereas I/O bus bridge 912 couples the two buses 806 and 908 to each other. A system memory 914 and one or more network/communication interfaces 916 may couple to bus 906. Hardware system 900 may further include video memory (not shown) and a display device coupled to the video memory. Mass storage 918 and I/O ports 920 may couple to bus 908. Hardware system 900 may optionally include a keyboard, a pointing device, and a display device (not shown) coupled to bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 900 are described in greater detail below. In particular, network interface 916 provides communication between hardware system 900 and any of a wide range of networks, such as an Ethernet (e.g., IEEE 802.3) network, a backplane, etc. Mass storage 918 provides permanent storage for the data and programming instructions to perform the above-described functions implemented in servers 922, whereas system memory 914 (e.g., DRAM) provides temporary storage for the data and programming instructions when executed by processor 902. I/O ports 920 are one or more serial and/or parallel communication ports that provide communication between additional peripheral devices, which may be coupled to hardware system 900.

Hardware system 900 may include a variety of system architectures and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain embodiments of the present disclosure may not require nor include all of the above components. For example, the peripheral devices shown coupled to standard I/O bus 908 may couple to high performance I/O bus 906. In addition, in some embodiments, only a single bus may exist, with the components of hardware system 900 being coupled to the single bus. Furthermore, hardware system 900 may include additional components, such as additional processors, storage devices, or memories.

An operating system manages and controls the operation of hardware system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 10 illustrates an example network environment, in which various example embodiments may operate. Network cloud 1060 generally represents one or more interconnected networks, over which the systems and hosts described herein can communicate. Network cloud 1060 may include packetbased wide area networks (such as the Internet), private networks, wireless networks, satellite networks, cellular networks, paging networks, and the like. As FIG. 10 illustrates, particular embodiments may operate in a network environment comprising one or more networking systems, such as social networking system 120a, game networking system 120b, and one or more client systems 1030. The components of social networking system 120a and game networking system 120b operate analogously; as such, hereinafter they may be referred to simply at networking system 1020. Client systems 1030 are operably connected to the network environment via a network service provider, a wireless carrier, or any other suitable means.

Networking system 120 is a network addressable system that, in various example embodiments, comprises one or more physical servers 1022 and data stores 1024. The one or more physical servers 1022 are operably connected to computer network 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1030 to enter addresses of specific network resources to be retrieved, such as resources hosted by networking system 1020. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular webpage (hereinafter also referred to as target structured document) hosted by networking system 1020, the user's web browser, or other document Sequence Generator or suitable client application, formulates and transmits a request to networking system 1020. The request generally includes a URL or other document identifier as well as metadata or other information. By way of example, the request may include information identifying the user, such as a user ID, as well as information identifying or characterizing the web browser or operating system running on the user's client computing device 1030. The request may also include location information identifying a geographic location of the user's client system or a logical network location of the user's client system. The request may also include a timestamp identifying when the request was transmitted.

Although the example network environment described above and illustrated in FIG. 10 described with respect to social networking system 120a and game networking system 120b, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer system, comprising:
 a processor;
 a memory device holding an instruction set executable on the processor to cause the computer systems to perform operations comprising:
  generating a color row representative of positional coordinates of movement of pixel data in an animation according to one or more colors of a color space;
  dividing the color row into a plurality of segments of equal length;
  for each segment of the color row:
  scaling down the respective segment according to a first scaling factor to generate a down-scaled segment;
  expanding the down-scaled segment according to an original length of the respective segment;
  comparing at least one color distortion present in the expanded down-scaled segment to at least one color present in the respective segment with respect to a distortion threshold;
  upon determining the distortion threshold is not exceeded, generating a portion of a color time row, according to a gray scale color range, that corresponds to the respective down-scaled segment, wherein at least one dark color in the color time row represents an early time offset and at least one bright color represent a later time offset; and
  compressing the down-scaled segment with at least one color row reading position referenced by at least one early time offset in the color time row.

2. The computer system as in claim 1, wherein generating a color row representative of positional coordinates of movement of pixel data in an animation according to one or more colors of a color space comprises:
 generating a first color row for first pixel data, the first color row related to at least a portion of a duration of the animation;
 in the first color row:
  a first color row segment represents a first color for a first point in time in the duration of the animation and a second color for a second point in time in the duration of the animation, the first point in time prior to the second point in time; and
  a second color row segment represents a third color for a third point in time in the duration of the animation and the third color for a fourth point in time in the duration of the animation, the first and second point in time prior to the third point in time, the third point in time prior to the fourth point in time.

3. The computer system as in claim 2, wherein the first color maps to a first set of positional coordinates in a three-dimensional color space and the second color maps to a second set of positional coordinates in the three-dimensional color space, the first color different than the second color, the first set of positional coordinates different than the second set of positional coordinates; and
 wherein the third color maps to a third set of positional coordinates in a three-dimensional color space, the third set of positional coordinates different than the first and the second sets of positional coordinates, the first color, the second color and the third color different from each other.

4. The computer system as in claim 2, wherein scaling down the respective segment according to a first scaling factor to generate a down-scaled segment comprises:
 compressing the first color row segment according to the first scaling factor to generate a first down-scaled segment; and
 compressing the second color row segment according to the first scaling factor to generate a second down-scaled segment.

5. The computer system as in claim 4, wherein expanding the down-scaled segment according to an original length of the respective segment comprises:
  stretching color row content of the first down-scaled segment according to the original length to generate an expanded version of the first down-scaled segment; and
  stretching color row content of the second down-scaled segment according to the original length to generate an expanded version of the second down-scaled segment.

6. The computer system as in claim 5, wherein comparing at least one color distortion present in the expanded down-scaled segment to at least one color present in the respective segment with respect to a distortion threshold comprises:
  comparing, against the distortion threshold, a first color distortion present between color row content of the expanded version of the first down-scaled segment and color row content of the first color row segment; and
  comparing, against the distortion threshold, a second color distortion present between color row content of the expanded version of the second down-scaled segment and color row content of the second color row segment.

7. The computer system as in claim 6, wherein
  upon determining the distortion threshold is exceeded with regard to the first color distortion, re-compressing the first color row segment according to a second scaling factor to generate an updated first down-scaled segment, the second scaling factor larger than the first scaling factor; and
  for the first color row segment, repeating the operations of stretching, comparing, and re-compressing with subsequent larger scaling factors when the distortion threshold is exceeded.

8. The computer system as in claim 6, wherein, upon determining the distortion threshold is not exceeded, generating a portion of a color time row, according to a gray scale color range, that corresponds to the respective down-scaled segment comprises:
  generating a first color time row for the first down-scaled segment, the first color time row including first gray scale color reading offsets that gradually become darker as time in the first color time row increments, each offset in the first gray scale color reading offsets map to a respective color in the first down-scaled segment; and
  generating a second color time row for the second-down scaled segment, the second color time row including second gray scale color reading offsets that gradually become brighter as time in the second color time row increments, each offset in the second gray scale color reading offsets map to a respective color in the second down-scaled segment.

9. The computer system as in claim 8, wherein generating a first color time row for the first down-scaled segment comprises:
  placing a first reading offset in the first color time row to read a first color at a first position in the first down-scaled segment;
  based on determining a second color at a second position in the first down-scaled segment is different than the first color, placing a second reading offset in the first color time row to read the second color at the second position, the second reading offset darker than the first reading offset;
  based on determining a third color at a third position in the first down-scaled segment is the different than the first and second colors, placing a third reading offset in the first color time row to read the third color at the third position, the third reading offset darker than the second reading offset.

10. The computer system as in claim 8, wherein generating a second color time row for the second-down scaled segment, comprises:
  placing a first reading offset in the second color time row to read a first color at a first position in the second down-scaled segment;
  based on determining a second color at a second position in the second down-scaled segment is the same as the first color, placing a second reading offset in the second color time row to re-read the first color at the first position, the second reading offset brighter than the first reading offset;
  based on determining a third color at a third position in the second down-scaled segment is the same as the first color, placing a third reading offset in the second color time row to re-read the first color at the first position, the third reading offset brighter than the second reading offset; and
  wherein compressing the down-scaled segment with at least one color row reading position referenced by at least one early time offset in the color time row compresses:
    trimming the second and third positions of the second down-scaled segment to generate a further compressed version of the second down-scaled segment.

11. A non-transitory computer-readable medium storing executable instructions thereon, which, when executed by a processor, cause the processor to perform operations including:
  generating a color row representative of positional coordinates of movement of pixel data in an animation according to one or more colors of a color space;
  dividing the color row into a plurality of segments of equal length;
  for each segment of the color row:
    scaling down the respective segment according to a first scaling factor to generate a down-scaled segment;
    expanding the down-scaled segment according to an original length of the respective segment;
    comparing at least one color distortion present in the expanded down-scaled segment to at least one color present in the respective segment with respect to a distortion threshold;
    upon determining the distortion threshold is not exceeded, generating a portion of a color time row, according to a gray scale color range, that corresponds to the respective down-scaled segment, wherein at least one dark color in the color time row represents an early time offset and at least one bright color represent a later time offset; and
    compressing the down-scaled segment with at least one color row reading position referenced by at least one early time offset in the color time row.

12. The non-transitory computer-readable medium as in claim 11, wherein generating a color row representative of positional coordinates of movement of pixel data in an animation according to one or more colors of a color space comprises:
  generating a first color row for first pixel data, the first color row related to at least a portion of a duration of the animation;
  in the first color row:
    a first color row segment represents a first color for a first point in time in the duration of the animation and a second color for a second point in time in the duration of the animation, the first point in time prior to the second point in time; and a second color row segment represents a third color for a third point in time in the duration of the animation and the third color for a fourth point in time in the duration of the animation, the first and second point in time prior to the third point in time, the third point in time prior to the fourth point in time.

13. The non-transitory computer-readable medium as in claim 12, wherein the first color maps to a first set of positional coordinates in a three-dimensional color space and the second color maps to a second set of positional coordinates in the three-dimensional color space, the first color different than the second color, the first set of positional coordinates different than the second set of positional coordinates; and wherein the third color maps to a third set of positional coordinates in a three-dimensional color space, the third set of positional coordinates different than the first and the second sets of positional coordinates, the first color, the second color and the third color different from each other.

14. The non-transitory computer-readable medium as in claim 12, wherein scaling down the respective segment according to a first scaling factor to generate a down-scaled segment comprises:

compressing the first color row segment according to the first scaling factor to generate a first down-scaled segment; and compressing the second color row segment according to the first scaling factor to generate a second down-scaled segment.

15. The non-transitory computer-readable medium as in claim 14, wherein expanding the down-scaled segment according to an original length of the respective segment comprises:

stretching color row content of the first down-scaled segment according to the original length to generate an expanded version of the first down-scaled segment; and stretching color row content of the second down-scaled segment according to the original length to generate an expanded version of the second down-scaled segment.

16. The non-transitory computer-readable medium as in claim 15, wherein comparing at least one color distortion present in the expanded down-scaled segment to at least one color present in the respective segment with respect to a distortion threshold comprises:

comparing, against the distortion threshold, a first color distortion present between color row content of the expanded version of the first down-scaled segment and color row content of the first color row segment; and comparing, against the distortion threshold, a second color distortion present between color row content of the expanded version of the second down-scaled segment and color row content of the second color row segment.

17. The non-transitory computer-readable medium as in claim 16, wherein upon determining the distortion threshold is exceeded with regard to the first color distortion, re-compressing the first color row segment according to a second scaling factor to generate an updated first down-scaled segment, the second scaling factor larger than the first scaling factor; and for the first color row segment, repeating the operations of stretching, comparing, and re-compressing with subsequent larger scaling factors when the distortion threshold is exceeded.

18. The non-transitory computer-readable medium as in claim 16, wherein, upon determining the distortion threshold is not exceeded, generating a portion of a color time row, according to a gray scale color range, that corresponds to the respective down-scaled segment comprises:

generating a first color time row for the first down-scaled segment, the first color time row including first gray scale color reading offsets that gradually become darker as time in the first color time row increments, each offset in the first gray scale color reading offsets map to a respective color in the first down-scaled segment; and generating a second color time row for the second-down scaled segment, the second color time row including second gray scale color reading offsets that gradually become brighter as time in the second color time row increments, each offset in the second gray scale color reading offsets map to a respective color in the second down-scaled segment.

19. The non-transitory computer-readable medium as in claim 18, wherein generating a second color time row for the second-down scaled segment, comprises:

placing a first reading offset in the second color time row to read a first color at a first position in the second down-scaled segment;

based on determining a second color at a second position in the second down-scaled segment is the same as the first color, placing a second reading offset in the second color time row to re-read the first color at the first position, the second reading offset brighter than the first reading offset;

based on determining a third color at a third position in the second down-scaled segment is the same as the first color, placing a third reading offset in the second color time row to re-read the first color at the first position, the third reading offset brighter than the second reading offset; and wherein compressing the down-scaled segment with at least one color row reading position referenced by at least one early time offset in the color time row compresses:

trimming the second and third positions of the second down-scaled segment to generate a further compressed version of the second down-scaled segment.

20. A computer-implemented method, comprising:

generating a color row representative of positional coordinates of movement of pixel data in an animation according to one or more colors of a color space;

dividing the color row into a plurality of segments of equal length;

for each segment of the color row:

scaling down the respective segment according to a first scaling factor to generate a down-scaled segment;

expanding the down-scaled segment according to an original length of the respective segment;

comparing at least one color distortion present in the expanded down-scaled segment to at least one color present in the respective segment with respect to a distortion threshold;

upon determining the distortion threshold is not exceeded, generating a portion of a color time row, according to a gray scale color range, that corresponds to the respective down-scaled segment, wherein at least one dark color in the color time row represents an early time offset and at least one bright color represent a later time offset; and compressing the down-scaled segment with at least one color row reading position referenced by at least one early time offset in the color time row.

* * * * *